Figure 4:
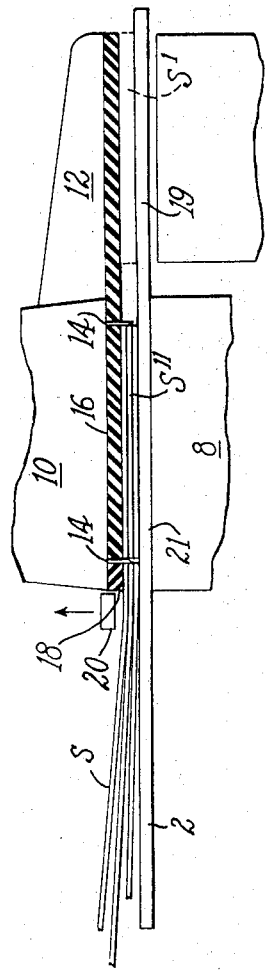
Figure 5:
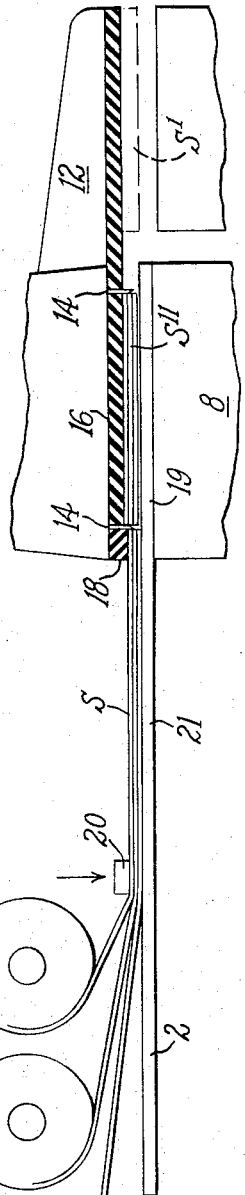

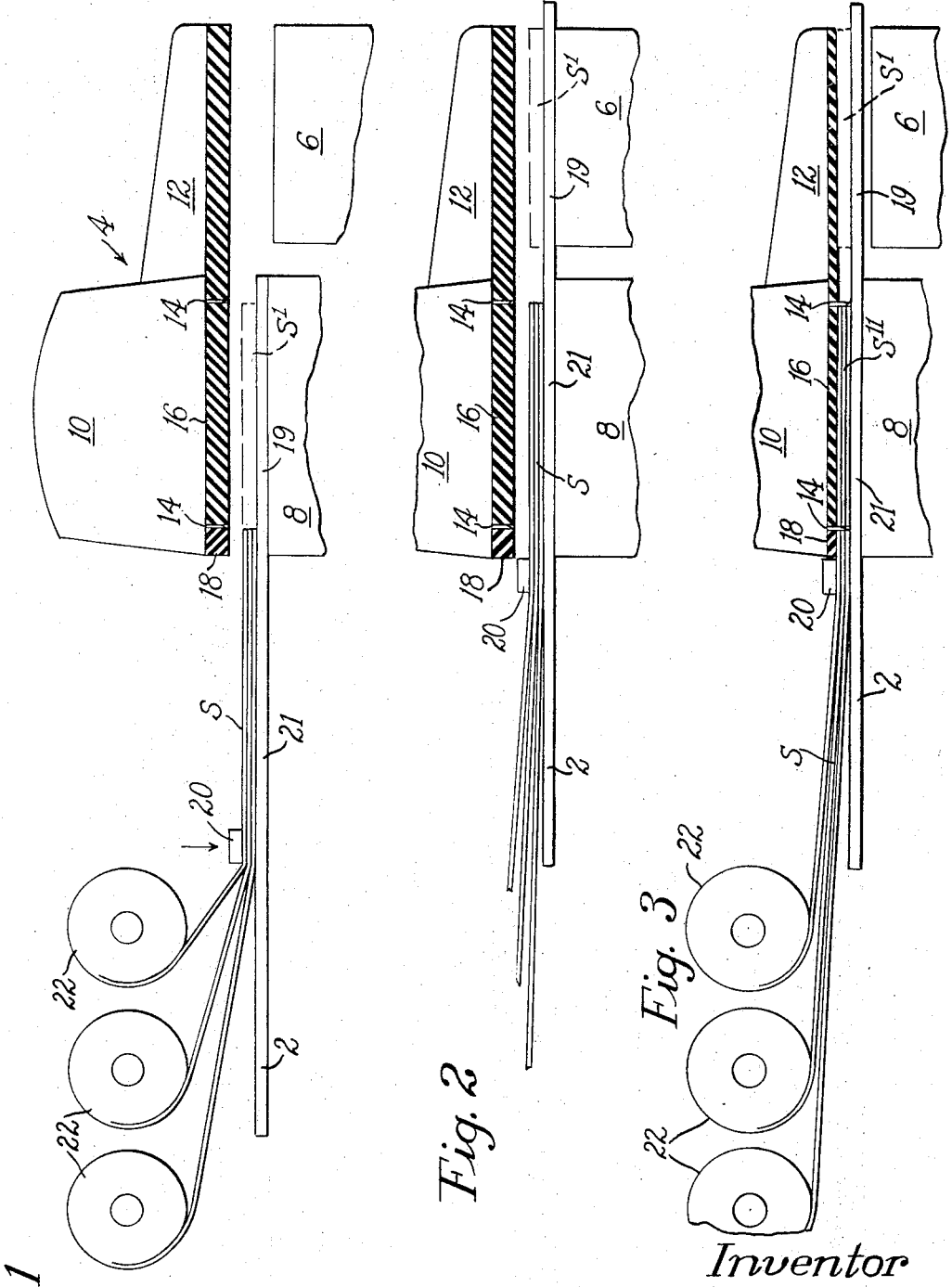

United States Patent Office 3,368,435
Patented Feb. 13, 1968

3,368,435
METHODS AND APPARATUS FOR
CUTTING SHEET MATERIAL
John S. Bastable, Leicester, England, assignor to United
Shoe Machinery Corporation, Boston, Mass., a corporation of New Jersey
Filed Feb. 8, 1966, Ser. No. 525,923
Claims priority, application Great Britain, Feb. 12, 1965, 6,121/65
5 Claims. (Cl. 83—23)

The present invention relates to improvements in methods of an apparatus for cutting sheet material.

Cutting sheet material by means of presses comprising a beam and a bed, both of which move during approach and separation is a common operation. It is more usual, however, to use a press having a stationary bed and a moving beam, but presses having a stationary beam and a moving bed are also used. When it is desired to cut parts or pieces continuously from rolls of sheet material, it is desirable, in order to obtain rapidity of operation, to provide for automatic feeding of the sheet material into the press and for automatic delivering out of the press of the cut sheet. Devices for achieving this are often complex and expensive.

It is one of the various objects of the present invention to provide a method of cutting parts or pieces from a supply of sheet material of indefinite length, which method simplifies the feeding of such material.

It is another of the various objects of the present invention to provide in a cutting press adapted for use in cutting pieces or parts from a sheet material of indefinite length means for automatically feeding the material to the press, which means are simple and inexpensive.

The present invention provides in one of its several aspects a method of cutting sheet material from a web or supply of indefinite length comprising the steps of clamping a lay of sheet material to an infeed portion of a feeding table, moving an end portion of the lay on the infeed portion of the table between a beam and a bed of a press, causing relative movement of approach of the beam and bed to cause cutting means supported on the beam to cut the sheet material against said infeed portion of the table, causing relative movement of separation of the beam and the bed to relieve pressure on the sheet material while retaining the material against movement of withdrawal by holding means carried by the beam, releasing the sheet material from the table and causing a movement of withdrawal of the table without moving the sheet material, to carry the infeed portion of the table from between the beam and bed of the press and to carry an outfeed portion of the table therebetween, and completing relative movement of separation of the bed and the beam to release the material for movement on the outfeed portion of the table.

In accordance with a feature of the present invention there is provided apparatus for cutting sheet material from a supply of indefinite length and comprising a press having a beam and a bed mounted for relative movement of approach and separation, the beam comprising a rearward extension, cutting means being mounted on the beam, a feeding table arranged to move between a rearward position, in which an outfeed portion of the table is positioned between the beam and the bed, and a forward position in which an infeed portion of the table is positioned between the beam and the bed and the outfeed portion is positioned under the extension, and means to clamp sheet material to the table, and holding means carried by the beam for retaining the material for movement of withdrawal with the table after the cutting pressure is relieved. Suitably and as shown, the holding means may comprise a friction pad extending over the downward facing surface of the beam and the extension.

The above and other of the various objects and several features of the present invention will become more clear from the following description, taken with the accompanying drawings, of an assembly illustrating the invention and its method of operation, which is also illustrative of the invention in certain of its aspects. It is to be understood that the illustrative assembly and the illustrative method have been selected for description by way of example of the invention only and not by way of limitation thereof.

In the accompanying drawings FIGS. 1 to 6 show, seriatim and diagrammatically, the illustrative assembly in various stages of operation in carrying out the illustrative method.

The illustrative assembly used for carrying out the illustrative method comprises a feeding table 2, a cutting press 4 and a stacking device 6.

The press 4 comprises a bed 8 and a beam 10 which comprises a rearward cantilever extension 12. The beam 10 is mounted for up and down movement in the usual manner and has cutting blades 14 attached to the undersurface of the beam. Also attached to the undersurface of the beam 10 is a friction pad 16 of foam rubber or similar material. The pad 16 extends over the downward facing surface of the beam 10 around the blades 14, and also extends over the corresponding undersurface of the extension 12. The pad 16 may be made of separate portions, to accommodate the blades 14. A forward portion 18 of the pad is preferably of somewhat less compressible material than the remainder of the pad 16.

Figure 6:
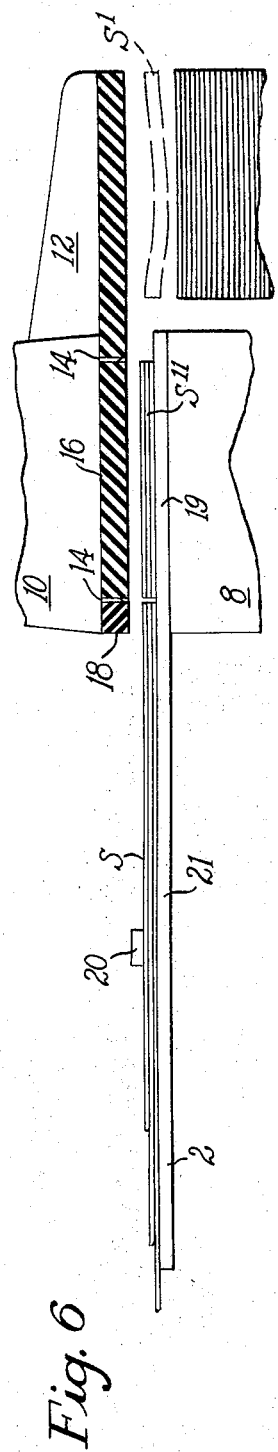

The feeding table 2 is provided with a polished metal surface, and is arranged to be reciprocated between a forward position in which an outfeed portion 19 of the table is under the extension 12 and an infeed portion 21 of the beam is between the beam 10 and the bed 8 (FIGS. 2, 3 and 4) and a rearward position in which the outfeed portion 19 of the table is between the bed 8 and beam 10, (FIGS. 1 and 6). A clamping bar 20 is mounted for movement with the table 2 and also for movement to and from the table 2 to clamp sheet material thereto.

In carrying out the illustrative method by use of the illustrative assembly, sheet material S, which may, for example, be material for the manufacture of scouring pads, is led from three rolls 22 onto the table 2. At the beginning of a cycle of operation of the illustrative assembly (FIG. 1) the table 2 is in a rearward position, sheet material S extends from the rolls 22, under the bar 20, which is in a clamping position clamping the material to the table 2, onto the infeed portion 21 of the table which is adjacent the press 4. Between the beam 10 and bed 8 of the press on the outfeed portion 19 of the table is a portion S' of cut sheet material. The table 2 and the clamp 20 are then caused to move forward into the position shown in FIG. 2, when the end portion of the sheet material on the portion 21 of the table is led in between the bed 8 and beam 10 of the press and the portion S' on the outfeed portion 19 of the table 2 is carried in under the extension 12 of the beam 10. The beam 10 is then caused to descend, the blades 14 severing a further portion S" (FIG. 3) from the sheet material S, and the pad 16 being compressed between the beam 10, extension 12 and the table 2. The beam 10 then begins to move up again. At this time the clamping bar 20 is also moved up to release the sheet material from the table (FIG. 4), and when the beam 10 has moved up sufficiently to relieve pressure on the sheet material S and the cut portions S' and S" while retaining the material and cut portions in frictional engagement with the pad 16 the table 2 and clamping bar 20 are moved to their rearward positions (FIG. 5) to carry the outfeed portion 19 of the table in between the beam 10 and bed 8 of the press. The friction between the table 2 and the sheet material S and portions S' and S" is sufficiently low for these to be undisturbed by the movement of the table. The portion 18 of the pad 16 is effective to hold the end portion of the sheet material S in place, the portion S" is positioned on the outfeed portion 19 of the table and, the portion S' drops down from the extension 12 onto the stacking device 6 which is self levelling.

When the table 2 has reached its rearward position the clamping bar 20 moves down again to clamp the sheet material S to the table 2 and the beam 10 completes its upward movement, leaving the cut portion S" on the outfeed portion 19 of the table 2 between the beam 10 and the bed 8.

While the illustrative assembly comprises a press having a moving beam it will be realized that a similar assembly may be provided utilizing a press having a moving bed. Further, while the illustrative assembly comprises a press having knives adapted to sever the material completely across and uses a friction pad to hold the work against movement of withdrawal, it is contemplated that in certain cutting operations, for example, employing suitable patterns of cutting dies, the dies may suffice by themselves to hold the material after a cut from movement of withdrawal with the table and it is consequently contemplated that the holding means carried by the beam for holding the material against withdrawal with the table may consist only of the cutting dies.

Having thus described my invention, what I claim as new and desire to secure by Letters Patent of the United States is:

1. A method of cutting sheet material from a supply of indefinite length which comprises the steps of clamping a lay of sheet material to an infeed portion of a feeding table, moving an end portion of the lay on the infeed portion of the table between a beam and a bed of a press, causing relative movement of approach of the beam and bed to cause cutting means supported on the beam to cut the sheet material against said infeed portion, causing relative movement of separation of the beam and the bed to relieve pressure on the sheet material while retaining the material against movement of withdrawal by holding means carried by the beam, releasing the sheet material from the table and causing a movement of withdrawal of the table without moving the sheet material to carry the infeed portion of the table from between the beam and bed of the press and to carry an outfeed portion of the table therebetween, and completing relative movement of separation of the bed and the beam to release the material for movement on the outfeed portion of the table.

2. A method as in claim 1 wherein the material is held from withdrawal by frictional engagement with the beam.

3. Apparatus for cutting sheet material from a supply of indefinite length and comprising, in combination, a press having a beam and a bed mounted for relative movement of approach and separation, the beam comprising a rearward extension, cutting means being mounted on the beam and a feeding table arranged to move between a rearward position in which an outfeed portion of the table is positioned between the beam and the bed, and a forward position in which an infeed portion of the table is positioned between the beam and the bed while the outfeed portion is positioned under the extension, and means to clamp sheet material to the table and holding means carried by the beam for retaining the material from movement of withdrawal with the table after the cutting pressure is relieved.

4. Apparatus as in claim 3 in which the holding means comprises a friction pad extending over a downward facing surface of the beam.

5. Apparatus as in claim 3 and additionally comprising resilient clamp means extending from a downward facing surface of the extension of said beam.

References Cited
UNITED STATES PATENTS

| | | | |
|---|---|---|---|
| 2,534,780 | 12/1950 | Lovenheim et al. | 83—266 X |
| 3,207,019 | 9/1965 | Vanzo et al. | 83—277 |

JAMES M. MEISTER, *Primary Examiner.*